US011620692B2

(12) United States Patent
Dueskar et al.

(10) Patent No.: US 11,620,692 B2
(45) Date of Patent: Apr. 4, 2023

(54) METHOD AND SYSTEM FOR AUTOMATED STYLIST FOR CURATION OF STYLE-CONFORMING OUTFITS

(71) Applicant: Stylitics, Inc., New York, NY (US)

(72) Inventors: Rohan Dueskar, New York, NY (US); Annie Wazer, Brooklyn, NY (US); Nuttanart Pornprasitsakul, Bangkok (TH); Leon Talbot, Levis (CA); Jeremy Raines, Hayward, CA (US)

(73) Assignee: Stylitics, Inc., New York, NY (US)

( * ) Notice: Subject to any disclaimer, the term of this patent is extended or adjusted under 35 U.S.C. 154(b) by 0 days.

(21) Appl. No.: 17/811,531

(22) Filed: Jul. 8, 2022

(65) Prior Publication Data

US 2022/0351265 A1    Nov. 3, 2022

Related U.S. Application Data

(63) Continuation of application No. 17/403,636, filed on Aug. 16, 2021, which is a continuation of application (Continued)

(51) Int. Cl.
    *G06Q 30/00*     (2023.01)
    *G06Q 30/0601*   (2023.01)

(52) U.S. Cl.
    CPC ..... *G06Q 30/0621* (2013.01); *G06Q 30/0643* (2013.01)

(58) Field of Classification Search
    CPC ........... G06Q 30/0621; G06Q 30/0643; G06Q 30/0641; G06F 16/54; G06F 16/5854; G06T 11/60
    See application file for complete search history.

(56) References Cited

U.S. PATENT DOCUMENTS 9,965,801 B1      5/2018  Wishne et al.
10,475,099 B1 *  11/2019  Nomula .................. G06T 19/20
(Continued)

FOREIGN PATENT DOCUMENTS

EP       1469407 A1 * 10/2004 ............ G06Q 20/40
WO  WO-2021087548 A1 *  5/2021

OTHER PUBLICATIONS

Iliukovich-Strakovskaia, Anna, et al. "Non-personalized fashion outfit recommendations." World Conference on Information Systems and Technologies. Springer, Cham, 2018 (Year: 2018).*
(Continued)

*Primary Examiner* — Matthew E Zimmerman
(74) *Attorney, Agent, or Firm* — Ansari Katiraei LLP; Arman Katiraei; Sadiq Ansari

(57) ABSTRACT

An auto-styler device may provide a style-based or outfit-driven shopping experience. The auto-styler device may select a style definition that defines a style-conforming outfit based on rules that apply to a combination of a first item type and a second item type of the style-conforming outfit, and that defines a customized presentation for the style-conforming outfit. The auto-styler device may generate a style-conforming outfit with a first item of the first item type and a second item of the second item type in response to a collective style produced by the combination satisfying the rules. The auto-styler device may position and size a first image of the first item relative to a second image of the second item in a single interface based on the specified the customized presentation of the style definition, and may present or publish the resulting single interface on a merchant site.

27 Claims, 12 Drawing Sheets

Related U.S. Application Data

No. 16/985,068, filed on Aug. 4, 2020, now Pat. No. 11,100,552.

(56) References Cited

U.S. PATENT DOCUMENTS

| | | | |
|---|---|---|---|
| 2009/0043674 A1* | 2/2009 | Minsky | G06Q 30/0603 715/765 |
| 2010/0094729 A1* | 4/2010 | Gray | G06Q 30/0643 705/26.1 |
| 2011/0078055 A1* | 3/2011 | Faribault | G06Q 30/0643 705/27.2 |
| 2011/0093361 A1* | 4/2011 | Morales | G06Q 30/0603 705/26.62 |
| 2011/0184780 A1* | 7/2011 | Alderson | G06Q 30/0643 705/14.55 |
| 2013/0104063 A1* | 4/2013 | Legris | G06F 3/0484 715/765 |
| 2014/0019281 A1* | 1/2014 | O'Dell | G06Q 30/0643 705/26.1 |
| 2014/0035913 A1* | 2/2014 | Higgins | G06Q 30/0641 345/420 |
| 2014/0071168 A1* | 3/2014 | Berglund | G06T 11/60 345/660 |
| 2014/0358737 A1* | 12/2014 | Burke | G06Q 30/0643 705/27.2 |
| 2014/0379426 A1* | 12/2014 | Guo | G06Q 50/01 705/26.7 |
| 2015/0302449 A1* | 10/2015 | Akbarpour | G06Q 30/0643 705/14.23 |
| 2016/0098775 A1* | 4/2016 | Ainsworth, III | G06Q 30/0222 705/26.7 |
| 2017/0039628 A1 | 2/2017 | Wang et al. | |
| 2017/0046769 A1* | 2/2017 | Jackson | G06Q 30/0643 |
| 2017/0076011 A1* | 3/2017 | Gannon | G06F 16/5866 |
| 2018/0047192 A1* | 2/2018 | Kristal | G06Q 30/0643 |
| 2018/0137515 A1* | 5/2018 | Higgins | G06T 17/00 |
| 2018/0308149 A1* | 10/2018 | Guo | G06N 3/044 |
| 2019/0244407 A1* | 8/2019 | Wiesel | G06Q 30/0643 |
| 2019/0266664 A1 | 8/2019 | Beckham | |
| 2020/0257976 A1* | 8/2020 | Polanía Cabrera | G06Q 30/0643 |
| 2020/0302506 A1* | 9/2020 | Parker | G06Q 30/0631 |
| 2020/0364767 A1 | 11/2020 | Bacharach et al. | |
| 2020/0375293 A1 | 12/2020 | Koh | |
| 2021/0035187 A1* | 2/2021 | Ning | G06F 16/535 |
| 2021/0334887 A1* | 10/2021 | Tang | G06Q 30/0282 |

OTHER PUBLICATIONS

Pavan Bahl, Rob Sanchez, Marc Raco, and Rohan Deuskar, "204—Rohan Deuskar of Stylitics—The Styling Army's Gone, The Quality Remains", Nov. 1, 2017, online audio available at http://f0a6712338bce50fa875-a63e7bb235489df2f5cc73d25074ae05.r77.cf5.rackcdn.com/fiyb_ep_204_stylitics_nab.mp3 [transcript provided].

Stylitics website, "Mix and Match", Aug. 26, 2018, https://web.archive.org/web/20180826114522/http://stylitics.com/products/e-commerce/.

\* cited by examiner

METHOD AND SYSTEM FOR AUTOMATED
STYLIST FOR CURATION OF
STYLE-CONFORMING OUTFITS

CLAIM OF BENEFIT TO RELATED
APPLICATIONS

This application is a continuation of U.S. nonprovisional application Ser. No. 17/403,636 entitled "Automated Stylist for Curation of Style-Conforming Outfits", filed Aug. 16, 2021 which is a continuation of U.S. nonprovisional application Ser. No. 16/985,068 entitled "Automated Stylist for Curation of Style-Conforming Outfits", filed Aug. 4, 2020, now U.S. Pat. No. 11,100,552. The contents of application Ser. No. 17/403,636 and Ser. No. 16/985,068 are hereby incorporated by reference.

BACKGROUND

Fashion and clothing purchases often involve selecting an article of clothing by considering other articles of clothing and/or clothing accessories that the purchaser has purchased or is looking to purchase. The purchaser considers the other articles of clothing and/or clothing accessories in order to create an outfit with two or more items that conform to a certain style.

However, retail and online stores offer an item-by-item shopping experience. The item-by-item shopping experience has the purchaser search for a first item type (e.g., pants) amongst a collection of items of that first item type. Upon selecting the first item, the purchaser then searches for a second item type (e.g., shirts) amongst a collection of items of that second item type. This item-by-item shopping experience does not provide the purchaser with a way to readily visualize different combinations of items may create different styles, and to shop based on the collective style rather than each item in isolation.

Figure 1:
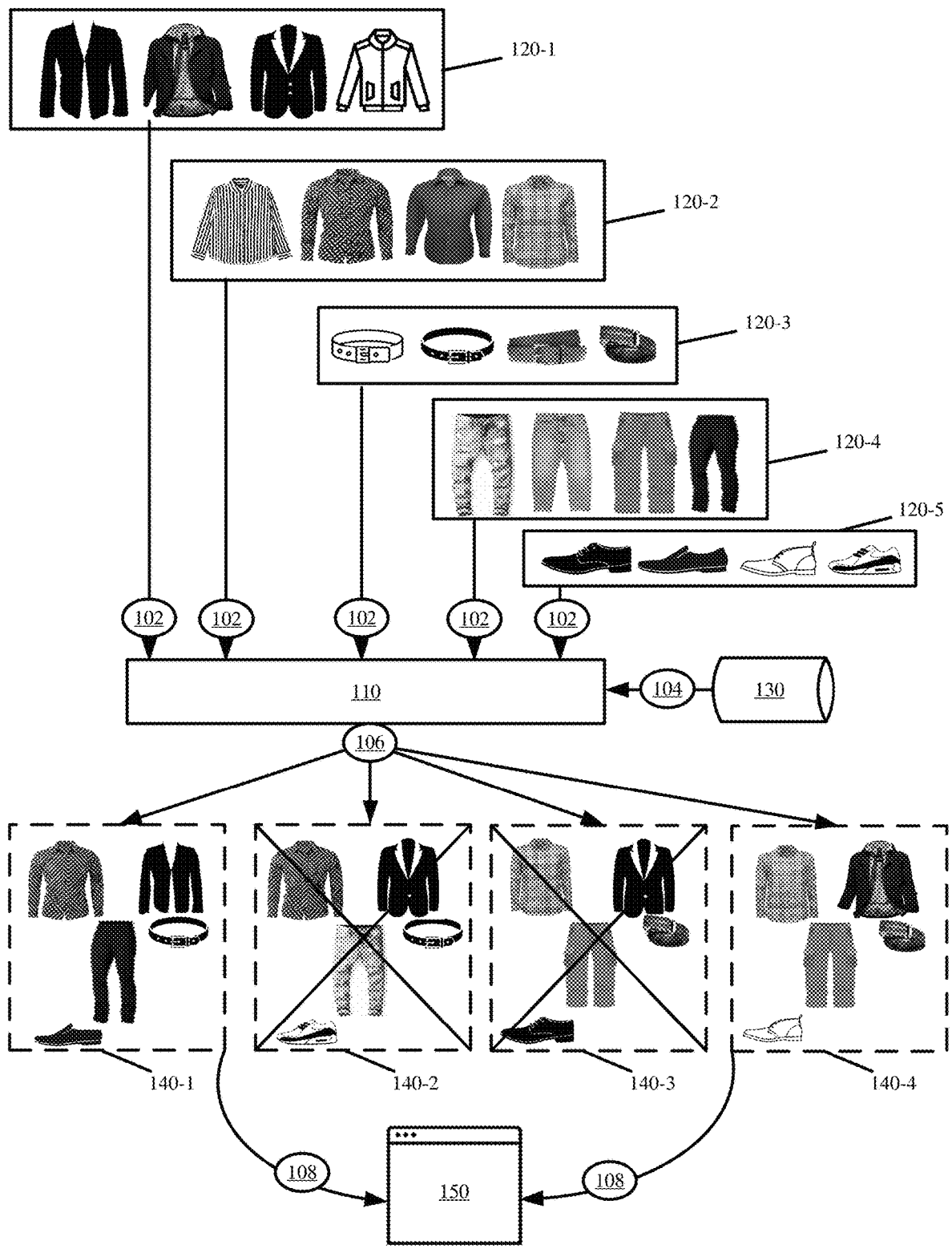
FIG. 1 illustrates an example of an auto-styler device automatically curating different style-conforming outfits in accordance with some embodiments presented herein.

DETAILED DESCRIPTION OF PREFERRED
EMBODIMENTS

The following detailed description refers to the accompanying drawings. The same reference numbers in different drawings may identify the same or similar elements.

Provided is an automated stylist or "auto-styler". The auto-styler may include systems and/or methods for automatically generating a plurality of outfits that conform to one or more styles, and for presenting the generated outfits in a single presentation so that users may readily visualize different styles that can be created from pairing items of different item types in an outfit. The auto-styler therefore promotes a style-based or outfit-driven shopping experience rather than the item-by-item shopping experience of traditional retail and online stores.

Each outfit, that is generated by the auto-styler, may comprise items that are selected from two or more types of clothing articles and/or clothing accessories, and that conform to a common style. The different items of the outfit are not different variants of the same article of clothing or clothing accessories, but different articles of clothing and clothing accessories that have different uses and one or more attributes for the style that is created by the collective grouping of items. The outfit style may therefore be defined as the collective look resulting from a desired combination of a pattern, color, material, cut, fit, brand, and/or other visual characteristics from different items of different item types.

Different types of clothing articles may include shirts, sweaters, jackets, pants, shorts, socks, underwear, etc. Different types of clothing accessories may include hats, gloves, shoes, jewelry, purses, scarves, etc. The types of clothing articles and/or clothing accessories may be defined more generally. For instance, tops, pants, underwear, and outerwear may define different types of clothing accessories. Conversely, the types of clothing articles and/or clothing accessories may be defined more precisely. For instance, t-shirts, dress shirts, blouses, athletic shirts, and polo shirts may be defined as specific types of clothing articles, rather than a single type of clothing article (e.g., tops or shirts). In any case, each type of clothing article or clothing accessory may have a different use, utility, purpose, and/or attributes. For instance, clothing tops have a different use, utility, purpose, and/or attributes than clothing bottoms, underwear, hats, belts, shoes, etc.

The auto-styler may programmatically select two or more items from two or more different item types based on a style definition for an outfit with a particular collective look. The style definition may filter the outfit to include items from a subset of item types, and may further filter combinations of items from the subset of items types that may be paired together in the outfit. The style definition prevents the random inclusion of items from any item type in the outfit, and further prevents random pairings of items from the subset of item types to form the outfit.

FIG. 1 illustrates an example of auto-styler 110 automatically curating different style-conforming outfits in accordance with some embodiments presented herein. Auto-styler 110 may ingest (at 102) a plurality of different items from a plurality of different item types 120-1, 120-2, 120-3, 120-4, and 120-5 (sometimes collectively referred to as "item types 120" or individually as "item type 120"). In FIG. 1, item types 120 may include jackets, button-down shirts, belts, pants, and shoes. Alternatively, item types 120 may include outerwear, tops, accessories, bottoms, and footwear.

Auto-styler 110 may select (at 104) one or more style definitions 130 from a plurality of different style definitions. Auto-styler 110 may adjust the selection (at 104) of style definitions 130 at different times based on merchant preferences, user preferences, machine learning, and/or rules. For instance, the merchant may receive new formalwear, and may want to promote or prioritize the display of the new formalwear. Accordingly, auto-styler 110 may select (at 104) style definitions 130 that define different styles for formal outfits. Similarly, auto-styler 110 may select (at 104) style definitions 130 for promoting new seasonal styles depending on the time of year. Each style definition 130 may be defined by a merchant or customer of auto-styler 110, or may be automatically defined by auto-styler 110 using artificial intelligence and/or machine learning.

Auto-styler 110 may produce (at 106) outfits 140-1, 140-2, 140-3, and 140-4 (sometimes collectively referred to as "outfits 140" or individually as "outfit 140") by combining different items from item types 120. In producing (at 106) outfits 140, auto-styler 110 may determine which outfits 140 conform to one or more style definitions 130 by comparing attributes for the items in each outfit 140 against style definitions 130. In some embodiments, auto-styler 110 may select a first item as a "seed" item for outfit 140, and may select other items that complete the style for outfit 140 (e.g., satisfy style definition 130) and that complement the seed item. For instance, the selected style definition 130 may define a "summer" style, and the selection of a particular pair of shorts or a particular pair of long pants as the seed item may alter the subsequent selection of other items for completing the summer style outfit.

As shown in FIG. 1, outfits 140-2 and 140-3 may contain items or item attributes that do not conform to a style definition 130, and auto-styler 110 may reject or discard outfits 140-2 and 140-3 that do not conform to a style definition 130. For instance, outfits 140-2 and 140-3 may include a jacket that is classified as formalwear, and one or more of pants and shoes that are classified as casual. No style definition 130 may permit such a combination of formalwear with casual items. Accordingly, auto-styler 110 may reject or discard outfits 140-2 and 140-3.

Outfits 140-1 and 140-4 may satisfy one or more style definitions 130. Accordingly, auto-styler 110 may publish (at 108) outfits 140-1 and 140-4 to user interface ("UI") 150 (e.g., a website or application) where the collective set of items of each outfit 140-1 and 140-4 may be presented in UI 150 in order to assist a shopper in discovering items that may be paired together to create a cohesive and desired style. In some embodiments, style-conforming outfits 140-1 and 140-4 may be presented to a site administrator for validation prior to publishing on UI 150.

Auto-styler 110 may automatically customize the presentation of each outfit 140. Customizing the presentation may include auto-styler 110 providing an optimal arrangement and layout for the items of each outfit 140 so that a user can readily visualize the collective style of the generated outfit 140, and the interplay between the style attributes of the different items in that generated outfit 140. More specifically, the optimal arrangement and layout may include placing the outfit items together in a layered and partially overlapping, but non-obscuring, arrangement in UI 150 so that a user can visualize the entire outfit without having separate windows, screens, sites, and/or interfaces open for each item that the user wants to style together.

Figure 2:
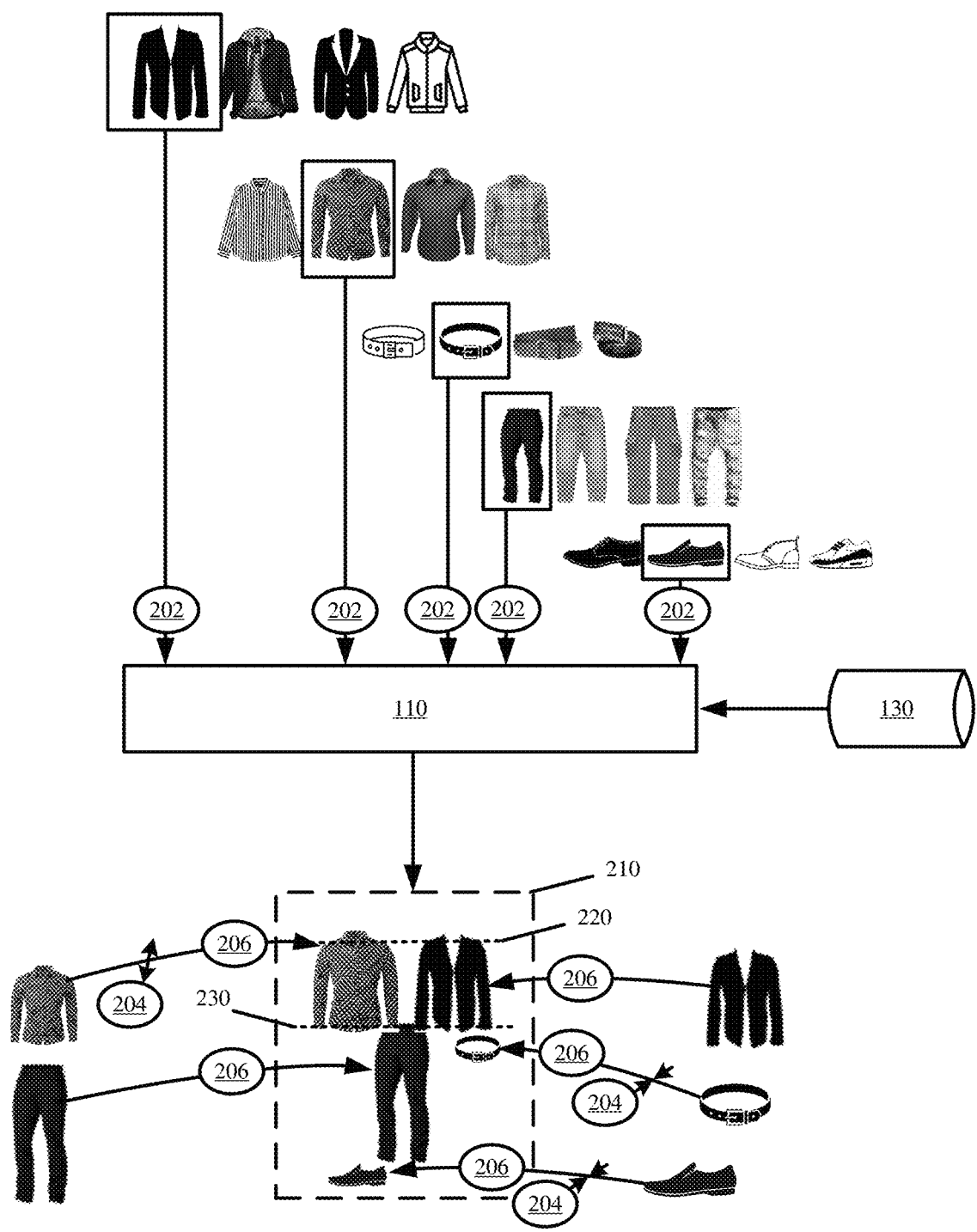
FIG. 2 illustrates an example for automatically customizing the presentation of an outfit in accordance with some embodiments presented herein.

FIG. 2 illustrates an example for automatically customizing presentation 210 of outfit 140-1 in accordance with some embodiments presented herein. Auto-styler 110 may select and group (at 202) different items from different item types 120 to create outfit 140-1 that conforms to one or more style definitions 130. Auto-styler 110 may then customize presentation 210 of the selected items for outfit 140-1 to showcase the style that is created by two or more items of outfit 140-1 in a single interface, rather than showcase each item individually in a separate interface or apart from one another as is done in traditional online sites.

As shown in FIG. 2, customizing presentation 210 may include resizing (at 204) images for one or more of the items in outfit 140-1 so that the items are presented with desired proportions relative to one another. In some embodiments, auto-styler 110 may resize (at 204) the images so that the depicted items are of the same size or proportion. In some other embodiments, auto-styler 110 may resize (at 204) the images so that certain items are displayed more prominently than others. Although not shown, auto-styler 110 may enlarge the jacket relative to other items in outfit 140-1 when outfit 140-1 is for a winter look, the jacket is a focal point or prominent item of outfit 140-1, the jacket is a best-selling item, the jacket is on sale, the jacket is a promoted item, etc. In some embodiments, auto-styler 110 may resize (at 204) an image for a particular item based on previous sizing used for that particular item in another outfit. The previous item image size may take precedence over resizing items in the outfit to the same size or proportion. Alternatively, auto-styler 110 may override the previous item image size to ensure that the images have a common size or proportion.

Customizing presentation 210 may further include positioning (at 206) the resized images in a common interface. In positioning (at 206) the resized images, auto-styler 110 may arrange some items around a particular item of outfit 140-1, may align items to a common height, and/or may partially overlap two or more items to better present the common style of those items. For instance, auto-styler 110 may position (at 206) the shirt, jacket, shoes, and belt of outfit 140-1 around and/or relative to the pants. Auto-styler 110 may align the shirt and jacket so that the neckline of each is on first common plane 220, and so that the bottom of the shirt and jacket partially overlap with the top of the pants about second common plane 230. The alignment and overlap of items may improve the visualization or presentation of the stylistic interplay between these items. Auto-styler 110 may also determine a z-depth ordering or layering for the items that places the shirt and jacket over the pants.

As a result of the customizations, presentation 210 may provide a direct and singular visualization for the collective style of the combined items. In other words, customized presentation 210 may illustrate how the attributes from each of the selected jacket, the selected shirt, the selected pants, the selected belt, and the selected shoes contribute to create a cohesive and holistic style for outfit 140-1, wherein the holistic style of outfit 140-1 may be different than the style of each individual item in insolation.

By presenting holistic style of outfit 140-1, rather than each item in isolation, customized presentation 210 may promote the purchase of different pairings or combinations of items from outfit 140-1 based on the style resulting from the pairings or combinations, rather than a purchase of a single item that is viewed in isolation without reference to other items. Stated differently, auto-styler 110 may promote a style-based or outfit-driven shopping experience rather than the item-by-item shopping experience of traditional retail and online stores.

Each item may be stored separately in a data store. Each data store entry may contain data about a single particular item. For instance, as a merchant receives new inventory, the merchant may update the data store with new entries for each new item that is received.

Figure 3:
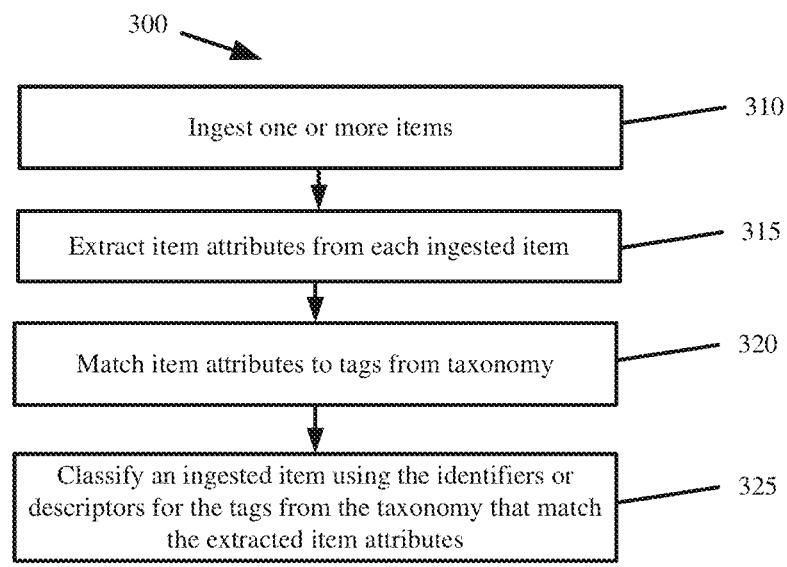
FIG. 3 presents a process for providing the auto-styler device with new items that the auto-styler device may use to generate different outfits that conform to a common style in accordance with some embodiments presented herein.

Auto-styler 110 may generate outfits 140 based on the items that are present in one or more data stores. FIG. 3 presents a process 300 for providing auto-styler 110 with new items that auto-styler 110 may use to generate outfits 140 that conform to a common style in accordance with some embodiments presented herein.

Process 300 may include ingesting (at 310) one or more items from a data store. The data store may be updated by a merchant that operates a retail or online store, and the merchant may use auto-styler 110 for the automated outfit generation. Auto-styler 110 may periodically ingest (at 310) the items from the data store. For instance, auto-styler 110 may ingest (at 310) items on a daily basis to discover available inventory and/or new items that have been received. Ingesting (at 310) the one or more items may include auto-styler 110 establishing a feed or link with the data store, and downloading data about the items from the data store over a data network. In some embodiments, auto-styler 110 may be integrated with the data store, and may ingest (at 310) the items from the data store via a direct interface to the data store.

Auto-styler 110 may ingest (at 310) the one or more items with item data that includes an item name, an item image, and/or one or more item attributes. The one or more attributes may provide the item price, seasonality, look, pattern, color, material, cut, fit, brand, size, and/or other visual characteristics or properties of the item. The item data may be stored as a single file with metadata, as a file with one or more database entries and values, and/or as a set of files.

Process 310 may include extracting (at 315) the item attributes from each ingested item. In some embodiments, auto-styler 110 may directly extract (at 315) the item attributes from the downloaded item data. In some other embodiments, auto-styler 110 may extract (at 315) the item attributes by processing the item data. For instance, auto-styler 110 may perform image analysis on the image of an ingested item in order to determine attributes such as the item color, pattern, formality (e.g., formal, casual, business-casual, athletic, etc.), and/or identifier (e.g., shirt, pants, sweater, etc.). Auto-styler 110 may also extract (at 315) the item attributes from the item name. For instance, the item name may be defined to include the brand name, an item identifier, cut, fit, and/or other attributes.

Process 310 may include matching (at 320) the extracted item attributes to tags within an auto-styler taxonomy. Auto-styler 110 may produce outfits 140 for different merchants or customers, and each merchant may use different identifiers or descriptors for the same attributes. Accordingly, auto-styler 110 may perform the matching (at 320) to identify a common set of identifiers or descriptors for the attribute values of the ingested items.

Process 310 may include classifying (at 325) the ingested items using the identifiers or descriptors for the tags from the taxonomy that match the extracted item attributes. In some embodiments, classifying (at 325) the ingested item may include replacing and/or updating the item attributes with the common set of identifiers or descriptors from the matching tags of the auto-styler taxonomy. For instance, may replace a first item attribute of "aqua" with the identifier "blue" from the auto-styler taxonomy, and may replace a second item attribute of "shirt" with a more descriptive identifier "t-shirt" that is extracted from analyzing the item image. In some embodiments, classifying (at 325) the ingested items may include adding identifiers or descriptor from the matching tags as new item attributes that are not extracted from the item attributes, and that are derived from analyzing the item. For instance, auto-styler 110 may classify (at 325) certain items as petite or big-tall based on image analysis and available sizes, and other items as seasonal based on the ingest date and/or coloring of the items. Auto-styler 110 may store the ingested items with the identifiers and descriptors from the matching tags in local storage or memory, or may write the identifiers and descriptors from the matching tags to the data store where the original item data is stored.

Auto-styler 110 may reference the item classifications in order to automatically generate an outfit title or caption for a generated outfit. For instance, a set of items that are included in an outfit may include a common "summer" identifier or descriptor, and auto-styler 110 may label or title that outfit as a summer outfit. In some embodiments, outfit titles may be provided in style definitions 130, and auto-styler 110 may append and/or modify the title within a particular style definition 130 based on the identifiers and descriptors that are used to classify the items included in an outfit conforming to the particular style definition 130.

In some embodiments, classifying (at 325) the ingested items may include adding different scores for each tag or item attribute. The score may represent a confidence-level or percentage by which the extracted item attribute matches to a tag in the taxonomy. For instance, auto-styler 110 may tag a first item with the color red and a score of 100 when the item is a solid red color, and may tag a second item with the color red and a score of 50 when the item has red and other coloring.

Auto-styler 110 may use the scores to determine whether certain items can be used in an outfit to satisfy the overall style for that outfit or to rank resulting outfits for conformity to a style. For instance, auto-styler 110 may generate a first outfit in which one or more of the items have a score less than 100 for a particular attribute (e.g., items may have formal and causal uses), and may generate a second outfit in which the items have a score of 100 for the particular attribute (e.g., items only have a formal use). The outfit style may emphasize or may be based on the particular attribute (e.g., an outfit with a formal styling), and auto-styler 110 may therefore rank the second outfit as better conforming to the outfit style than the first outfit based on the scoring of the particular attribute.

Auto-styler 110 may generate different groupings of the classified items to create outfits 140 that satisfy or conform to different style definitions 130. Accordingly, each style definition 130 may define a different outfit style (e.g., acceptable combinations of items and/or item attributes for a style-conforming outfit). Each style definition 130 may include a template and one or more rules.

Figure 4:
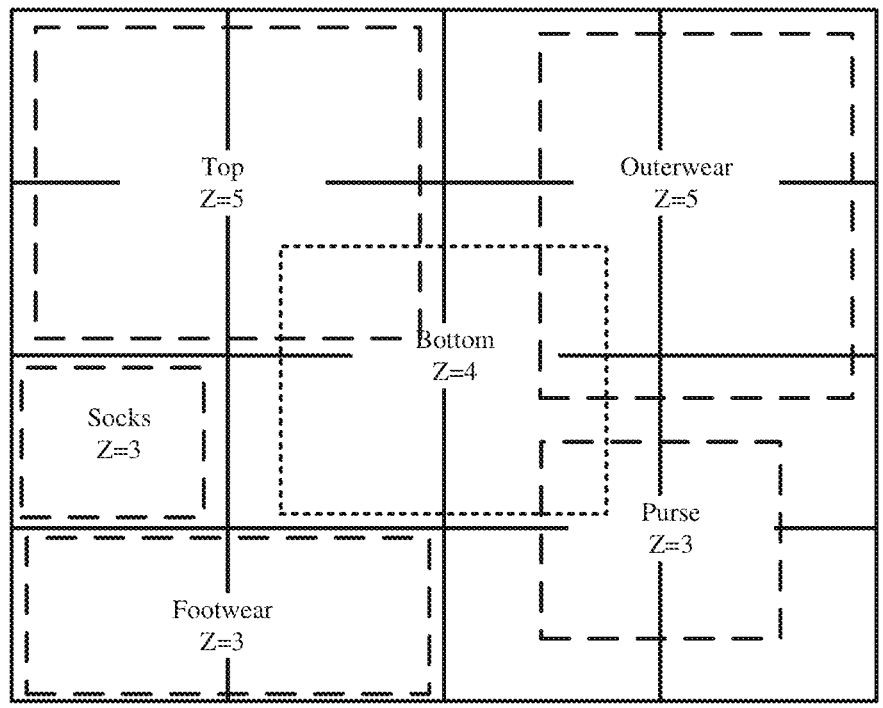
FIG. 4 illustrates an example of a first template and a second template for generating different outfits in accordance with some embodiments presented herein.
Figure 4:
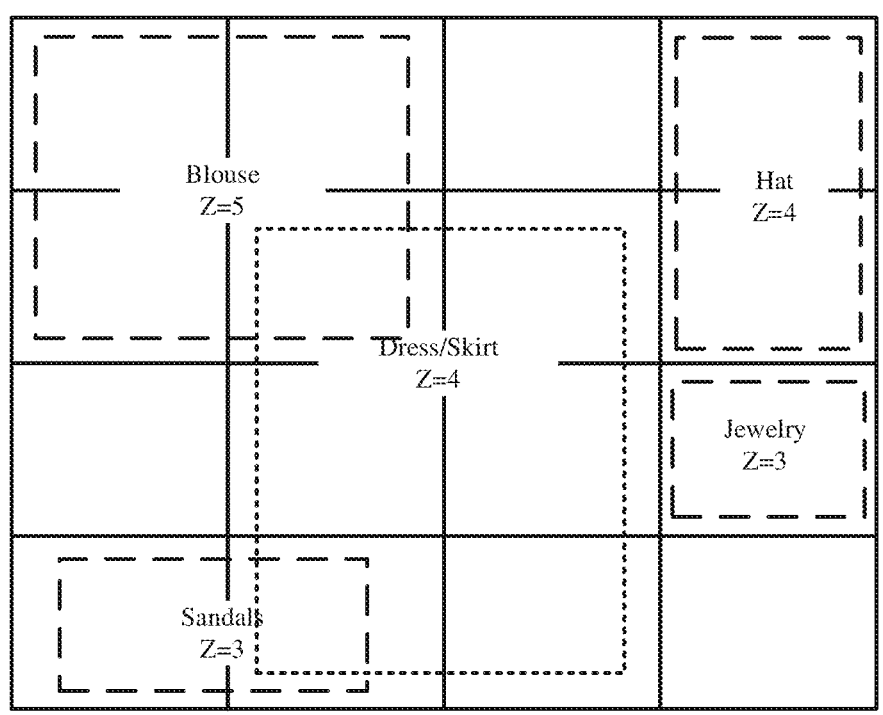

FIG. 4 illustrates an example of first template 410-1 and second template 410-2 for generating different outfits 140 in accordance with some embodiments presented herein. First template 410-1 and second template 410-2 may sometimes be collectively referred to as "templates 410", or may be individually referred to as "template 410".

Each template 410 may specify two or more different item types that are to be included in an outfit 140. For instance, first template 410-1 may define a first outfit that includes one item of a clothing top, outerwear, clothing bottom, socks, footwear, and purse, and second template 410-2 may define a second outfit that includes one item of a blouse, hat, dress or skirt, sandals, and jewelry. Accordingly, outfits 140 that are created according to first template 410-1 and second template 410-2 are different in terms of the included items and the resulting style, wherein the resulting style may be determined in part from the item types included in each outfit 140.

Each template 410 may specify a visual presentation for the selected items from each include item type. Each template 410 may specify a position, size, rotation, and z-depth for each included item. For instance, first template 410-1 may specify positioning a first item (e.g., the image of the first item), that is a clothing "top" type, at the center of the upper left quadrant, and may specify sizing the first item image to remain within the upper left quadrant. Similarly, first template 410-1 may specify positioning a second item, that is of the "socks" type, within a single leftmost region that is below the upper left quadrant. In some embodiments, templates 410 may specify a different sizing and/or rotation for different item types, and may provide boundaries within which images for items of a particular item type must fit. For instance, first template 410-1 may set the boundary for the item image of the "top" type to be 120% the size of the boundary for the item image of the "bottom" type. Also, the boundary for the item image of the "outerwear" type may be elongated to accommodate images for shorter outerwear, such as jackets, and for longer outerwear, such as coats. The z-depth may define a layered ordering of the items, and which item will obscure another item in the visual presentation when there is overlap between the items. The positioning, sizing, rotation, and/or z-depth may therefore be used to more prominently display certain items of outfit 140 and less prominently display other items of that same outfit 140.

Templates 410 may provide a baseline style for the item types that may be included in an outfit 140. In some embodiments, templates 410 may not restrict which items of the permissible item types may be included in that outfit 140. For instance, first template 410-1 may require pairing of a clothing top with a clothing bottom, but the clothing top may have any pattern or coloring that may conflict with the pattern or coloring of the clothing bottom.

Accordingly, each style definition 130 may include one or more rules to further define the style of the outfit 140 that is created according to that style definition 130. The one or more rules may be linked to one or more templates 410, and may further define the style for an outfit by filtering which items from the permitted item types of a selected template 410 may be selected and paired together to create an outfit 140. In other words, templates 410 may restrict auto-styler 110 to selecting items from a filtered subset of available item types, and the one or more rules may restrict auto-styler 110 to selecting between a filtered subset of items from each of the subset of available item types. The rules may also vary the selection of templates 410 in order to ensure a sufficient variety of outfits 140 and outfit styles.

Auto-styler 110 may receive the rules from merchants, stylists, and/or from automated rule generation routines. Each rule may apply to one or more item types included in an outfit 140, and/or may specify a condition for including or excluding, in an outfit 140, one or more items from the same or different item types based on their respective item attributes.

Figure 5:
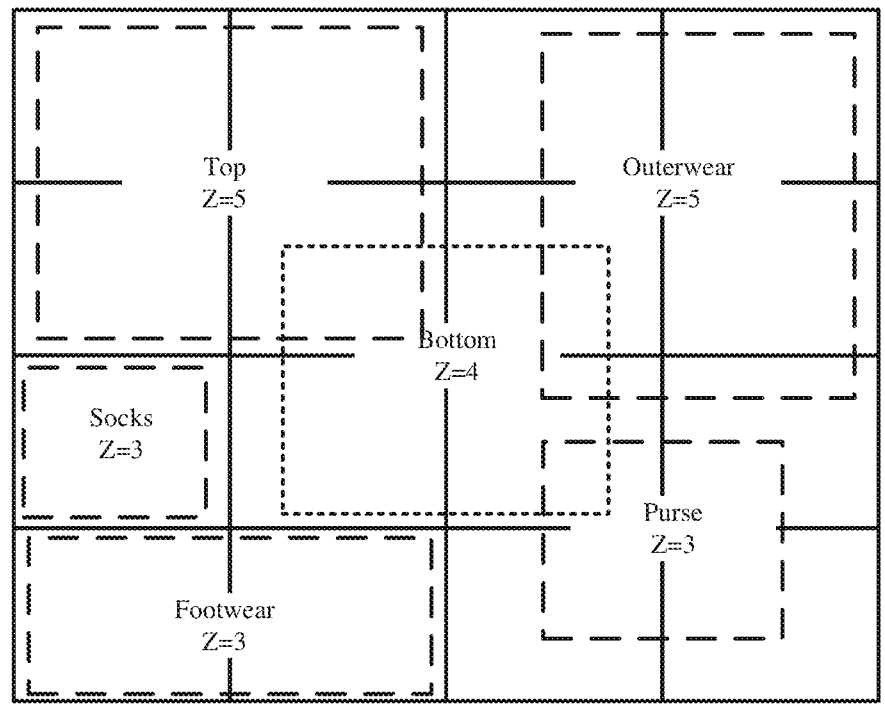
FIG. 5 illustrates examples of different rules for defining the style for an outfit in accordance with some embodiments presented herein.

FIG. 5 illustrates examples of different rules 510-1, 510-2, and 510-3 for defining the style for an outfit 140 in accordance with some embodiments presented herein. Rules 510-1, 510-2, and 510-3 may sometimes be collectively referred to as "rules 510", or may be individually referred to as "rule 510".

Rules 510 may be defined as part of a style definition 130 that also includes template 410-1. Accordingly, auto-styler 110 may generate an outfit that conforms to a specific style that is defined based on template 410-1 and rules 510.

Each rule 510 may apply to a single item type or item, or to a pairing or combination of two or more item types or items. For instance, first rule 510-1 may require the style-conforming outfit to have a clothing top that is of the same brand as a clothing bottom included in that outfit. Consequently, first rule 510-1 may restrict the pairing or combination of these two items or item types of the outfit to a particular subset of clothing tops and a particular subset of clothing bottoms.

Second rule 510-2 and third rule 510-3 may apply to the entire outfit. In particular, auto-styler 110 may select an item from one of the item types included in template 410-1 to have an attribute set to "patterned", and may select items for the other item types included in template 410-1 to have an attribute that is not set to "patterned" based on second rule 510-2. Alternatively, auto-styler 110 may select an item that is checkered, striped, polka-dotted, or otherwise patterned for one of the item types included in template 410-1, and may select items that is solid, plain, or printed for the other item types included in template 410-1. Similarly, auto-styler 110 may select items with a certain average price to generate an outfit in which the total cost of all items is less than a threshold amount specified as part of the third rule 510-3. Alternatively, auto-styler 110 may generate item combinations that satisfy rules 510-1 and 510-2, and may compute the total price of items in the generated item combinations to determine which combinations also satisfy third rule 510-3.

Auto-styler 110 may use template 410-1 and rules 510 to ensure that the resulting outfit conforms to a specific style (e.g., a particular style definition 130), and is not a random grouping of items from different item types. In some embodiments, auto-styler 110 may apply rules 510 when selecting items to include in an outfit. For instance, auto-styler 110 may filter which subset of items from a permissible subset of item types may be used to form an outfit using rules 510. Alternatively, auto-styler 110 may generate different potential outfit combinations that include different combinations of items from the subset of item types that satisfy requirements of template 410-1. Auto-styler 110 may then compare the items and item attributes of each potential outfit against rules 510, and may determine which outfits satisfy rules 510 and which outfits have items or item attributes that violate one or more of rules 510. Auto-styler 110 may retain outfits that satisfy rules 510 as outfits that conform to the style defined by rules 510 and/or style definition 130 that includes those rules 510. Auto-styler 110 may discard or invalidate outfits that violate one or more rules 510 as outfits that do not conform to the style defined by rules 510 and/or style definition 130 that includes those rules 510.

Auto-styler 110 may generate multiple outfits that conform to a common style. In other words, auto-styler 110 may generate different outfits with different item combinations that satisfy the same style definition 130.

Auto-styler 110 may rank the outfits based on diversity, item prioritization, brand prioritization, and/or other criteria. Auto-styler 110 may rank the outfits for diversity to ensure that similar outfits with mostly the same overall visual appearance or mostly the same items are not repeated in the user accessible UI at or near the same time to the same user. Auto-styler 110 may rank the outfits based on item prioritization to ensure that certain best-selling, popular, new, or other designated items (e.g., overstock of yellow sweaters, seasonal items, etc.) are included in the outfits that are presented to users. Auto-styler 110 may rank the outfits based on brand prioritization to ensure that brands that have paid to have their items promoted more prominently than other brands will have their items included in outfits that are higher ranked than outfits that do not include items of those brands.

Figure 6:
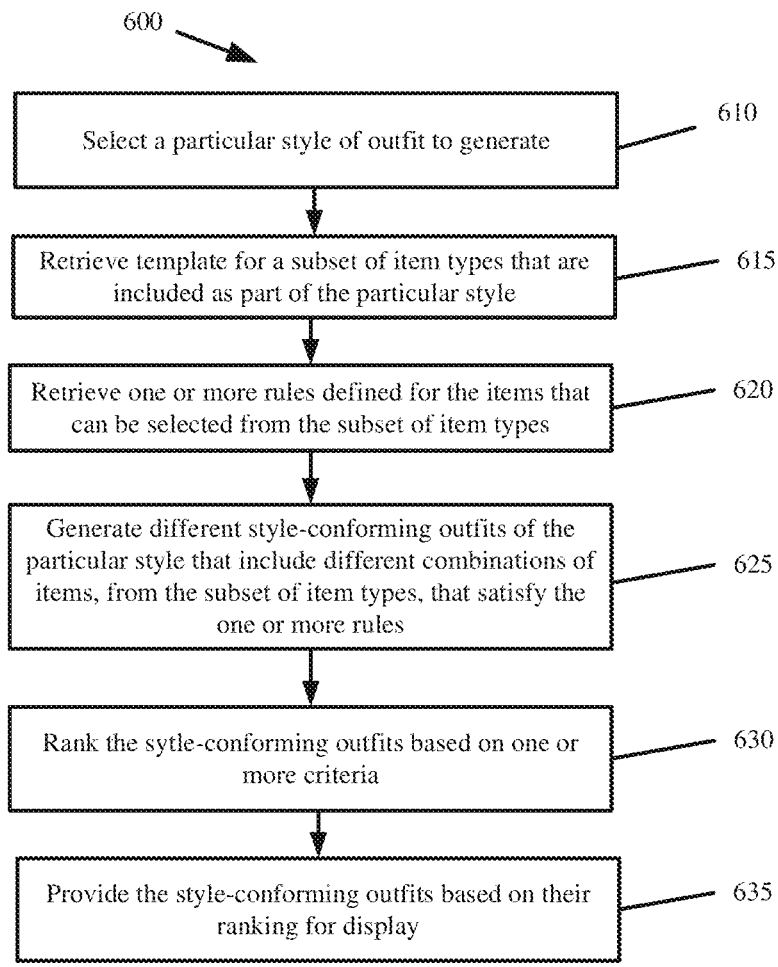
FIG. 6 presents a process for automated outfit generation and ranking in accordance with some embodiments presented herein.

FIG. 6 presents a process 600 for automated outfit generation and ranking in accordance with some embodiments presented herein. Process 600 may be performed by auto-styler 110.

Process 600 may include selecting (at 610) a particular style of outfit to generate. The selection (at 610) may include retrieving at least one style definition 130 for generating outfits of the particular style from a plurality of different style definitions 130.

In some embodiments, auto-styler 110 may be configured to generate a certain number of outfits that satisfy a particular style or style definition 130, and/or to generate multiple outfits for different defined styles or style definitions 130 on a periodic basis. In some embodiments, auto-styler 110 may be configured to update existing outfits. Updating an existing outfit with a particular style may include ensuring that the items and item attributes of the existing outfit continue to conform to the particular style, and/or substituting one or more of the items with items that are newer, more popular, in stock, and/or vary the look of the existing outfit so that the same outfit is not repeated over a long period of time.

Auto-styler 110 may base the selection (at 610) of the particular style of outfit to generate based on merchant preferences, user preferences, machine learning, and/or rules. The merchant preferences may cause auto-styler 110 to prioritize selection of certain styles or style definitions 130 that the merchant wishes to promote, or may control when certain styles (e.g., seasonal styles, occasional styles, etc.) are selected by auto-styler 110. User preferences may be used to customize the style selection in real-time when different users access the merchant site. For instance, auto-styler 110 may customize the style selection for a particular user based on previous items that were purchased by that particular user, and/or based on tracked user engagement that identifies the different styles the particular user engages with the most. Auto-styler 110 may use machine learning to determine styles that are popular, lead to the highest sale conversion, etc., and may bias the style or style definition 130 selection (at 610) accordingly. Rules may be defined to ensure sufficient variety in the styles that are selected by auto-styler 110. For instance, the merchant preferences may specify promoting "summer" styles, and the rules may cause auto-styler 110 to select and generate a first outfit based on a first summer style definition 130, to avoid a second summer style definition 130 that is too similar to the first summer style definition 130, and to select and generate a second outfit based on a third summer style definition 130 that may include different item types, style attributes, or other variety that is determined to be sufficiently different from first and second summer style definitions 130.

Process 600 may include retrieving (at 615) a template that defines a subset of item types that are included as part of the particular style, and retrieving (at 620) one or more rules that define the style for the items that can be selected from the subset of item types. In some embodiments, the retrieved style definition 130 may include the retrieved template and the retrieved one or more rules for the selected particular style.

Process 600 may include generating (at 625) different style-conforming outfits of the particular style that include different combinations of items, from the subset of item types, that satisfy the one or more rules. As noted above, auto-styler 110 may filter each of the subset of item types to identify the subset of items in each item type that satisfies the one or more rules, and may generate one variation of the particular style outfit by selecting an item from the subset of items that is filtered for each item type of the subset of item types. Alternatively, auto-styler 110 may select different combinations of items from the subset of item types, and may filter the combinations to exclude combinations with items and/or item attributes that violate the one or more rules, and to include combinations for style-conforming outfits with items and/or item attributes that satisfy the one or more rules.

In some embodiments, generating (at 625) the different style-conforming outfits may include generating a caption or title for each style-conforming outfit. Auto-styler 110 may generate the caption or title for a particular style-conforming outfit based on a caption or title within the style definition 130, that was used to generate the particular style-conforming outfit, and/or based on the descriptors or identifiers that are used to classify the items included in the particular style-conforming outfit. For instance, one or more of the items in the particular style-conforming outfit may be tagged or classified as having a "vintage" look, and the style definition 130 may define a "floral" outfit. Accordingly, auto-styler may automatically generate a "vintage floral" caption or title for the particular style-conforming outfit based on the combination of the style definition 130 data and the item data.

Process 600 may include ranking (at 630) the style-conforming outfits based on one or more criteria. Ranking (at 630) the style-conforming outfits may include determining the generated outfits that most closely match the particular style. Auto-styler 110 may sum or compute a total score for each outfit based on the scores for the item attributes that are used in defining the one more rules, and may rank the generated outfits based on the total score. For instance, if the one or more rules require the outfit items to have first and second colors, auto-styler 110 may rank a first outfit with items that are primarily the first and second colors over a second outfit with items that include other colors or that only partially include the first and second colors. Ranking (at 630) the style-conforming outfits may also include prioritizing outfits with item combinations that are the most diverse from one another. For instance, auto-styler 110 may prioritize style-conforming outfits that have more two or more different items between the outfits over style-conforming outfits in which only one item is different between the outfits. As another example, auto-styler 110 may prioritize the outfits with the greatest variation in colors, the selected item of a particular item type (e.g., a t-shirt versus a button-down shirt), formality (e.g., a formal outfit versus a casual outfit), etc. Ranking (at 630) the style-conforming outfits may include filtering a subset of the style-conforming outfits. Similar to auto-styler 110 excluding combinations of items that did not conform to the particular style and/or satisfy the one or more rules, auto-styler 110 may exclude the lowest ranked style-conforming outfits.

Process 600 may include providing (at 635) the style-conforming outfits based on their ranking for display. Providing (at 635) the style-conforming outfits may include providing an arranged presentation of the images for the items of a particular outfit, and/or a generated caption or title for the particular outfit. In some embodiments, auto-styler 110 may directly publish the style-conforming outfits to UI 210 that users can remotely access via a data network in order to look at and/or order one or more items within the style-conforming outfits.

UI 210 may correspond to or may be part of a website, webpage, or other network accessible content. UI 210 may be defined with HyperText Markup Language ("HTML") code, scripting code, Cascading Style Sheets ("CSS"), and/or other code. UI 210 may be accessed in response to user directing a browser, application, or user equipment ("UE") to a Uniform Resource Locator ("URL") for the website, webpage, or other network accessible content of UI 210.

In some other embodiments, auto-styler 110 may provide (at 635) the style-conforming outfits in a different UI that is accessible by a site administrator. The site administrator may view the style-conforming outfits in the UI, and may select which outfits to publish on user-exposed UI 210 that users can remotely access in order to look at and/or order one or more items within the style-conforming outfits. In other words, auto-styler 110 may allow the site administrator an opportunity to review, approve, and reject the style-conforming outfits prior to publishing the outfits for user access.

Figure 7:
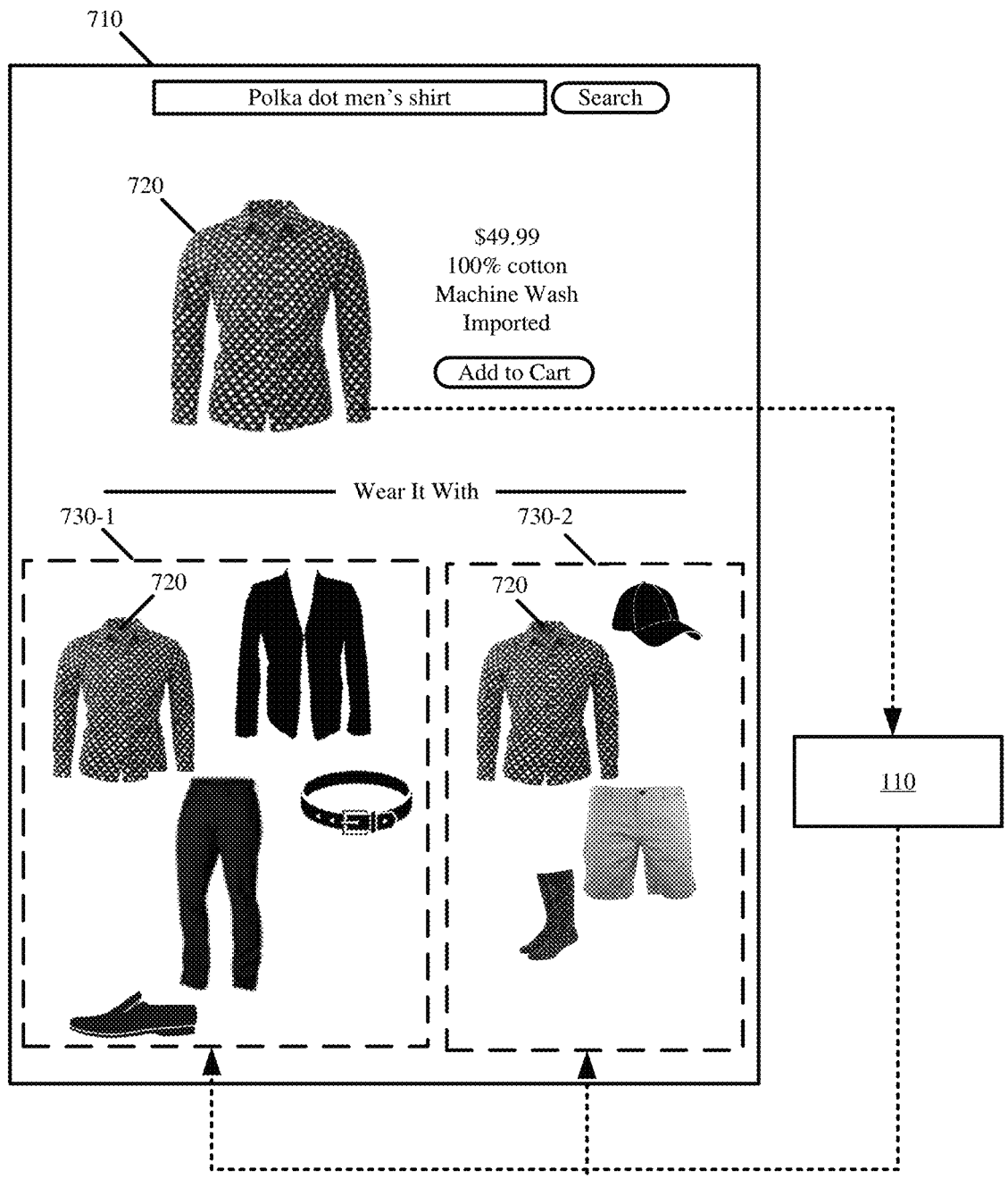
FIG. 7 illustrates an example of dynamically generating or selecting style-conforming outfits based on user input in accordance with some embodiments presented herein.

In some embodiments, auto-styler 110 may base the generation or selection of style-conforming outfits on user input. FIG. 7 illustrates an example of dynamically generating or selecting style-conforming outfits based on user input in accordance with some embodiments presented herein.

As shown in FIG. 7, a user may access UI 710 and select item 720 to view. The user may enter a search query for item 720 in UI 710, or may select item 720 from a plurality of items of the same item type that are presented in UI 710. In this figure, the user has selected a polka dot men's shirt.

In response to the user input, UI 710 may change to provide information about item 720. As part of changing UI 710, auto-styler 110 may populate UI 710 with one or more outfits 730-1 and 730-2.

Outfits 730-1 and 730-2 may include item 720 with items of other item types, and each outfit 730-1 and 730-2 may have the same style or a different style that is created using different style definitions 130. Accordingly, auto-styler 110 may select outfits 730-1 and 730-2 for UI 710 based on the user selection or request for item 720.

In some embodiments, auto-styler 110 may dynamically generate style-conforming outfits 730-1 and 730-2 that include item 720 in response to receiving the user input for item 720. In particular, a user may submit a request (e.g., a HyperText Transfer Protocol ("HTTP") GET message) to a front-end host operated by or on behalf a merchant. The front-end host may be accessed from one or more web servers and/or a URL, domain name, or network address that is associated with the front-end host. The front-end host may receive the request, and may respond with a landing page that the user may use to enter the query for item 720 or select item 720. The front-end service may process the user input and retrieve information about item 720 to include in UI 710, and may also provide the user input to auto-styler 110 via an Application Programming Interface ("API") call, Representational State Transfer ("REST") call, or other network communication. In response to the user input, auto-styler 110 may generate first outfit 730-1 by selecting a first style definition 130, item 720, and a set of items from other item types that, when combined with item 720, satisfy the first style definition 130. Auto-styler 110 may also generate second outfit 730-2 by selecting a different second style definition 130, item 720, and a different set of items from other item types that, when combined with item 720, satisfy the second style definition 130. In this example, first outfit 730-1 may satisfy a formal style definition, and second outfit 730-2 may satisfy a different casual style definition. Auto-styler 110 may return first outfit 730-1 and second outfit 730-2 to the front-end host in a JavaScript Object Notation ("JSON"), Extensible Markup Language ("XML"), or other data-interchange format. The front-end host may incorporate first outfit 730-1 and second outfit 730-2 into UI 710, and may provide UI 710 with information about item 720 and outfits 730-1 and 730-2 to the requesting user.

In some other embodiments, auto-styler 110 may select outfits 730-1 and 730-2 from a plurality of previously generated style-conforming outfits based on the user input. Once again, the front-end host may provide the user input to auto-styler 110. However, rather than dynamically generate outfits 730-1 and 730-2, auto-styler 110 may search the plurality of previously generated style-conforming outfits to identify a subset of outfits that include item 720. Auto-styler 110 may select outfits 730-1 and 730-2 from the subset of outfits based on some criteria. In this example, auto-styler 110 may use diversity criteria to select outfit 730-1 for a formal styling of the particular item, and outfit 730-2 for a casual styling of the particular item. Auto-styler 110 may provide the selected style-conforming outfits 730-1 and 730-2 to the front-end host for inclusion and presentation in UI 710.

Figure 8:
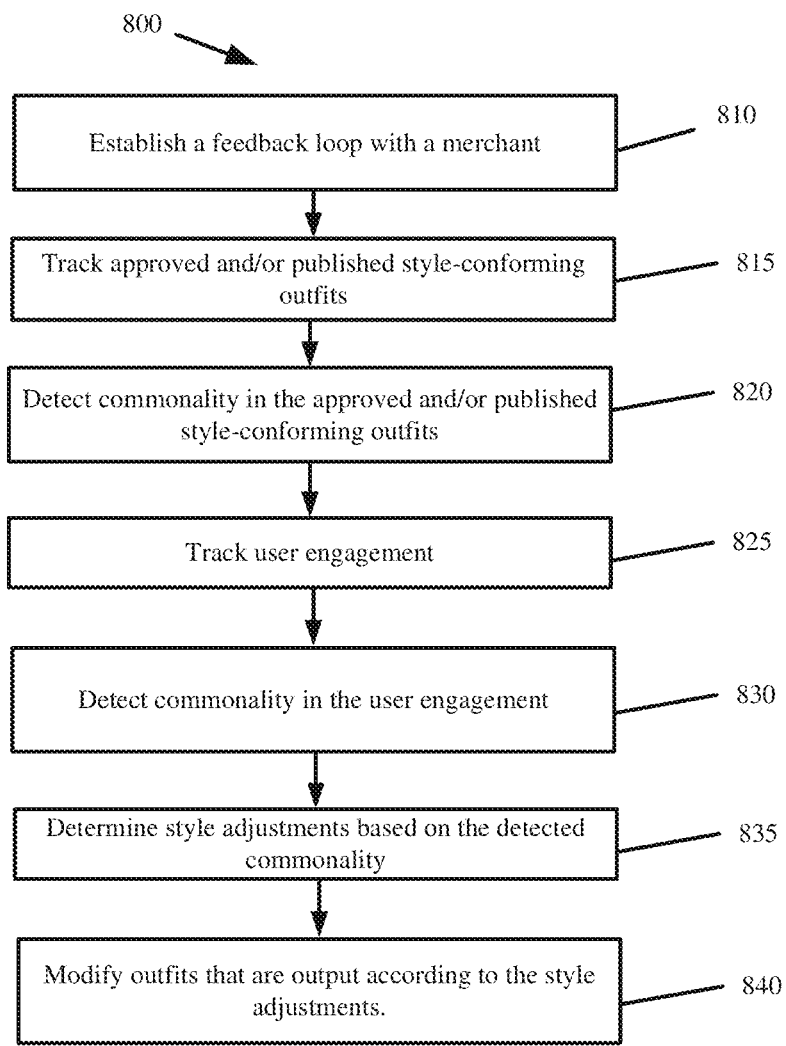
FIG. 8 presents a process for the customization or reranked presentation of outfits using artificial intelligence and/or machine learning in accordance with some embodiments presented herein.

Auto-styler 110 may use artificial intelligence and/or machine learning to customize or rerank the style-conforming outfits over time as user interests, merchant preferences, inventory, and/or other conditions change. FIG. 8 presents a process 800 for the customization or reranked presentation of outfits using artificial intelligence and/or machine learning in accordance with some embodiments presented herein. Process 800 may be performed by auto-styler 110.

Process 800 may include establishing (at 810) a feedback loop with a merchant. The feedback loop may include various connections, interfaces, and/or resources that auto-styler 110 may use to obtain information from the merchant. The feedback loop may include access to the front-end host and/or databases of the merchant.

Process 800 may include using the feedback loop to track (at 815) style-conforming outfits that have been approved and/or published by the merchant. Process 800 may include detecting (at 820) commonality in the approved and/or published style-conforming outfits. Detecting (at 820) may include performing pattern recognition and trend analysis to determine certain items, item attributes, and/or item arrangements that repeat with a threshold frequency in each of the approved and/or published style-conforming outfits. For instance, auto-styler 110 may analyze the approved and/or published style-conforming outfits to determine that red is the most frequent color for items in those outfits, that checkered patterns are more frequently presented than solid or other patterns, that total cost for a threshold number of outfits is below a certain amount, that more outfits include jewelry over hats and other clothing accessories, that the outfits include more items of in-house brands than other brands, etc. Additionally, auto-styler 110 may determine certain styles (e.g., style definitions 130, templates, rules, etc.) that the merchant prefers based on outfits created with those styles being published more often than outfits created with other styles.

Process 800 may include using the feedback loop to track (at 825) user engagement with the published outfits and/or other user input or interactions with the merchant site. In some embodiments, auto-styler 110 may have access to item inventory counts, website tracking data, and/or an order database of the merchant, and may retrieve the tracking information from these sources. In some other embodiments, auto-styler 110 may have direct access to the front-end host or may embed tracking beacons or code in the UI that is presented to the user in order to track (at 825) the user engagement.

Process 800 may include detecting (at 830) commonality in the user engagement. In this instance, detecting (at 830) the commonality may include performing pattern recognition and trend analysis to determine to identify popular items, trends among purchased items, styles that are popular, seasonal differences in purchase patterns, different engagement by different groups of users (e.g., mobile device users purchasing a first set of items and desktop user purchasing a second set of items, older users engaging with a first set of items and younger users engaging with a second set of items, etc.), and/or other item attributes that are prioritized on different days, times, and/or events. In this manner, auto-styler 110 may programmatically learn and/or determine qualities of outfits and specific items that have had the most user engagement, that have generated the highest number of sales, and/or that satisfy other prioritization criteria.

Process 800 may include determining (at 835) one or more style adjustments based on the detected (at 820 and/or 830) commonality. In some embodiments, the style adjustments may improve the likelihood that one item is included in an outfit over other items with similar attributes, that items with a particular attribute value are included in an outfit over items with a different value for the particular attribute, and/or that outfits of a particular style are published more frequently than outfits of other styles. The style adjustments may be implemented by adjusting the scoring of different item attributes, or by changing auto-styler 110 selection criteria to prioritize the selection of items with certain attributes, items, and/or outfits. In some embodiments, determining (at 835) the style adjustments may include modifying one or more of the templates by changing what item types are included in a particular template and/or the positioning, arrangement, and/or alignment of items in the particular template based on the detected (at 820 and/or 830) commonality. In some embodiments, determining (at 835) the style adjustments may include reranking the generated outfits according to the detected (at 820 and 830) commonality.

Process 800 may include modifying (at 840) outfits that are output by auto-styler 110 according to the style adjustments. Modifying (at 840) the outfits may include using the adjusted selection criteria to output outfits that prioritize certain item attributes, items, and/or outfits. Auto-styler 110 may apply the adjusted selection criteria when selecting which items to include when generating an outfit, or to change the ranking of generated style-conforming outfits. For instance, auto-styler 110 may initially perform a random selection of items from a subset of items that satisfy rules of a particular style when generating an outfit with that particular style, and may change the selection criteria to bias the selection of items from the subset of items to prioritize items from a certain brand, items with certain attributes, etc. when generating a new outfit with that particular style.

In some embodiments, auto-styler 110 may be configured with additional style adjustments outside those derived from artificial intelligence and/or machine learning. For instance, a brand may pay to have its items included more frequently in the generated outfits. Accordingly, auto-styler 110 may be configured with style adjustments for prioritizing (e.g., increasing the ranking) of generated outfits with items of that brand, or for increasing the rate at which items of that brand are selected for inclusion in the generated outfits (e.g., changing the selection criteria). Alternatively, the customer may want to clear out selected items (e.g., yellow sweaters). Auto-styler 110 may be configured with style adjustments for prioritizing the ranking of generated outfits that include the selected items, or for increasing the rate at which the selected items are selected for included in the generated outfits.

Process 800 is for customizing outfits at the merchant level. Auto-styler 110 may also support customizations at the user level, wherein a user is someone or some device that accesses the site or UI with one or more generated outfits in order to view or purchase items. The user-level customizations may be implemented via artificial intelligence and/or machine learning.

Figure 9:
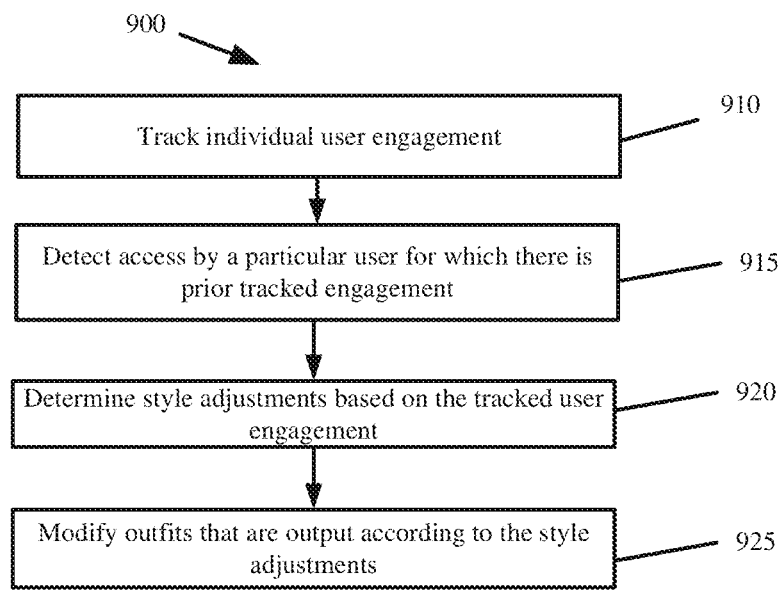
FIG. 9 presents a process for user-level customizations of outfits in accordance with some embodiments presented herein.

FIG. 9 presents a process 900 for user-level customizations of outfits in accordance with some embodiments presented herein. Process 900 may be performed by auto-styler 110 in addition to or instead of the process 800.

Process 900 may include tracking (at 910) engagement of individual users. Auto-styler 110 may track (at 910) the user engagement by accessing user profile information stored by a merchant, and/or by directly monitoring user behavior. For instance, auto-styler 110 may monitor the number of times different items are selected by a particular user, the number of queries by the particular user for a particular item or item attribute, the particular user's purchase history, the particular user's dwell time on different items (e.g., time spent hovering over or viewing a particular item), and/or other interactions that the particular user has with the items or outfits. The engagement of the particular user may be stored to a user profile along with an Internet Protocol ("IP") address, Media Access Control ("MAC") address, and/or another unique identifier of the particular user (e.g., unique identifier of the one or more devices used by the particular user, account of the particular user that is identified when the particular user provide login credentials, etc.).

Process 900 may include detecting (at 915) access by a particular user for which there is prior tracked engagement. For instance, auto-styler 110 may determine that the particular user is using a device with an address that matches to the unique identifier that is stored for a user profile with the tracked engagement, or may determine that the particular user is logged into an account that matches to an account identifier that is stored for the user profile with the tracked engagement. Detecting (at 915) access may include intercepting or otherwise obtaining user search queries and/or user interactions with items. In some embodiments, auto-styler 110 may detect (at 915) the particular user access in response to a query or request that the front-end host provides to auto-styler 110 via an API call or other messaging.

Process 900 may include determining (at 920) one or more style adjustments based on the tracked user engagement. The style adjustments may be based entirely on the tracked user engagement, or may be supplemented based on user search queries and/or other user interactions that the particular user has during an active session. The style adjustments may include prioritizing or reranking outfits with certain items or item attributes that match to items or attributes of items previously purchased by that user, swapping one or more items in a generated outfit with items or item attributes preferred by that user, and/or dynamically generating outfits to include items or item attributes that are preferred by that user.

Process may include modifying (at 925) one or more outfits that are output by auto-styler 110 for the particular user based on the one or more style adjustments that apply to the generated outfits. For instance, auto-styler 110 may detect, from the tracked user engagement, that the user previously purchased a particular item, and auto-styler 110 may modify the one or more generated outfits, that are presented to the particular user, to include outfits that style the particular item with other items. In doing so, the particular user may visualize items of different item types that match or conform to the style of the particular item previously purchased by the user. Alternatively, auto-styler 110 may determine, from the tracked user engagement, that the particular user is interested in casual outfits, and may therefore select different casual outfits to present to the particular user, rather than present a mix of business outfits, formal outfits, and casual outfits. Auto-styler 110 may also perform the style adjustments in response to user queries or user interactions. For instance, the user may provide a search query for an item and/or a particular attribute. Auto-styler 110 may retrieve a set of outfits that include the queried for item and/or particular attribute, and may select a subset of the set of outfits to present to the user based on the tracked user engagement. In particular, auto-styler 110 may select the subset of outfits to include outfits from the set of outfits with items and/or item attributes that match with preferred items and/or item attributes found within the tracked user engagement for that user.

In some embodiments, the user-level customizations may override or take precedence over the merchant-level customizations. In some other embodiments, the user-level customizations may enhance and/or further modify the merchant-level customizations. For instance, auto-styler 110 may generate a set of style-conforming outfits based on different style definitions 130, may select a first subset of style-conforming outfits from the set of style-conforming outfits based on the merchant-level customizations, and may select a second subset of style-conforming outfits from the first subset of style-conforming outfits based on the user-level customizations.

In addition to customizing the items that are included in a style-conforming outfit, auto-styler 110 may customize the presentation of the style-conforming outfits prior to publishing. Customizing the presentation may include resizing item images, rotating item images, and/or adjusting the positioning of the images to better convey the overall style created by the items in that outfit. Rather than randomly place the outfit items next to each other or in a staggered manner, auto-styler 110 may intelligently organize the item images to convey the outfit items in the manner that they will be worn. The customized presentation therefore provides a visualization for the style that is created by all items and/or different combinations of two or more items in the outfit, and that prioritizes the collective style of two or more items over the individual look of each item.

In some embodiments, auto-styler 110 may produce the customized presentation based on the template that is selected for creating the outfit. The template may provide auto-styler 110 with sizing and/or positional data for the item images.

Figure 10:
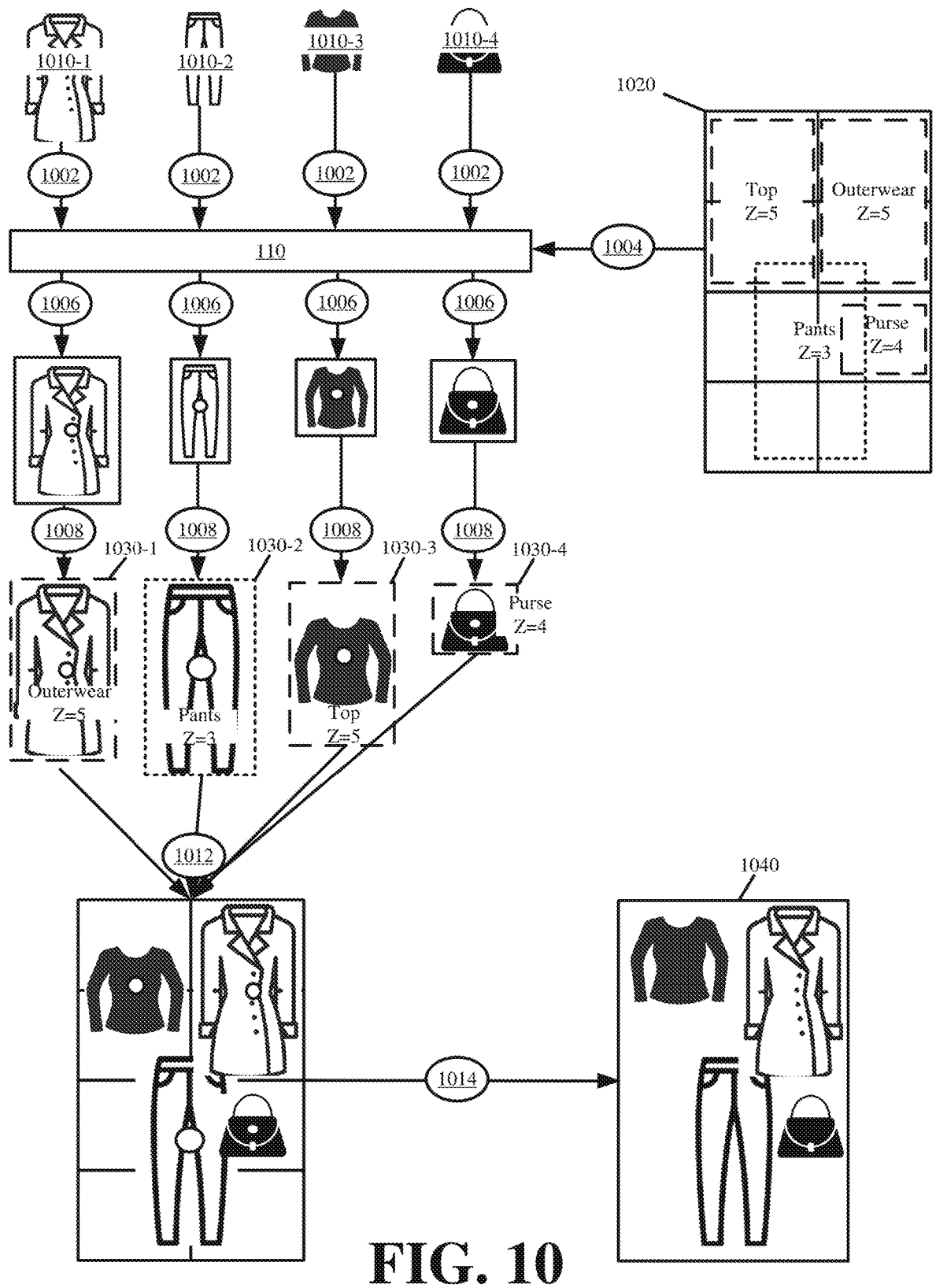
FIG. 10 illustrates an example for customizing the presentation of an outfit to provide an optimal visualization for the collective style that is created by the interplay of two or more items of that outfit in accordance with some embodiments presented herein.

FIG. 10 illustrates an example by which auto-styler 110 customizes the presentation of an outfit to provide an optimal visualization for the collective style that is created by the interplay of two or more items of that outfit in accordance in accordance with some embodiments presented herein. Auto-styler 110 may select a set of items to create an outfit that conforms to a particular style defined in a style definition 130, and may retrieve (1002) images of selected items 1010-1, 1010-2, 1010-3, and 1010-4 (sometimes collectively referred to as "item images 1010" or individually as "item image 1010"). Item images 1010 may have different sizes, resolutions, etc.

Auto-styler 110 may retrieve (at 1004) template 1020 for the outfit style, or template 1020 that is part of style definition 130 used in creating the outfit. Template 1020 may specify the sizing, rotation, positioning, and/or z-depth for image 1010 of each selected item for an item type included in template 1020.

To size and position item images 1010, auto-styler 110 may process (at 1006) item images 1010 to determine a center point in each item image 1010, and a boundary around the item that is presented in each image 1010. Auto-styler 110 may determine the center point via image analysis or by locating the central pixel of each image 1010. The boundary may include a rectangular or square box that encompasses pixels representing the item in each image 1010.

Auto-styler 110 may resize (at 1008) item images 1010 according to the sizing specified for the corresponding item types in template 1020. Template 1020 may specify a permitted maximum size for each image 1010, and each resized image 1030-1, 1030-2, 1030-3, and 1030-4 may occupy a different amount of the maximum size depending on the image dimensions and/or proportions of the depicted item. For instance, the selected top and outerwear items have different lengths such that the resized item images occupy a different percentage of the permitted space in template 1020. Moreover, the maximum size for the selected pants may be larger than the maximum size for the other items in order to more prominently display the pants within the outfit.

Auto-styler 110 may position (at 1012) resized item images 1030 to produce a first visualization of the outfit based on the positioning and z-depth ordering specified in template 1020. The z-depth ordering may allow for overlap between two or more resized item images 1030. Template 1020 may include overlap in order to present how the overlapping items complement the overall style of the outfit as well as each item's style. Auto-styler 110 may initially position (at 1012) the center point of resized item images 1030 to a corresponding center point for the represented item types in template 1020. Auto-styler 110 may also rotate one or more resized item images 1030 for correct positioning.

Auto-styler 110 may create a customized second presentation of the outfit in UI 1040 by adjusting (at 1014) the initial positioning and/or sizing of resized item images 1030. In particular, auto-styler 110 may align resized item images 1030 and/or adjust the amount of overlap or whitespace between resized item images 1030. For instance, auto-styler 110 may elevate resized item image 1030-3 to align the neckline of the represented item with the represented item of resized item image 1030-1, and may move resized item image 1030-4 away from resized item image 1030-2 to minimize overlap between the purse and pants. The image alignment may be performed by aligning one or more of the top, right, left, and/or bottom of the bounding box for two or more resized item images 1030. Other customizations may include adjusting (at 1014) item image positioning (e.g., moving item images, changing z-depth ordering, etc.) and/or sizing to vary the amount of overlap, more closely pair two items that are otherwise separated in the template, change which items are promoted in the outfit, and/or change the presentation of the outfit.

In some embodiments, auto-styler 110 may determine the item image positioning and/or sizing customizations from artificial intelligence and/or machine learning. For instance, auto-styler 110 may track positioning and/or sizing adjustments that a merchant performs on a generated outfit prior to publishing that outfit. Auto-styler 110 may also monitor the positioning and/or sizing of item images in outfits that the merchant publishes and/or that generate the highest volume of sales or user engagement. Auto-styler 110 may customize the positioning and/or sizing of item images for specific templates based on tracked and monitored data. Auto-styler 110 may also perform the adjustments in response to tracked user engagement, sales history, specified preferences, and/or other parameters. For instance, auto-styler 110 may identify a particular best-selling item in an outfit, and may customize the presentation of that outfit by increasing the size of the particular best-selling item relative to other items in that outfit even though the template may have defined an equal size for the particular best-selling item and other items of the outfit. Similarly, auto-styler 110 may identify a particular item that is on sale or that a brand has paid to promote on the merchant site, and may resize or reposition the particular item relative to other items in the generated outfit.

Figure 11:
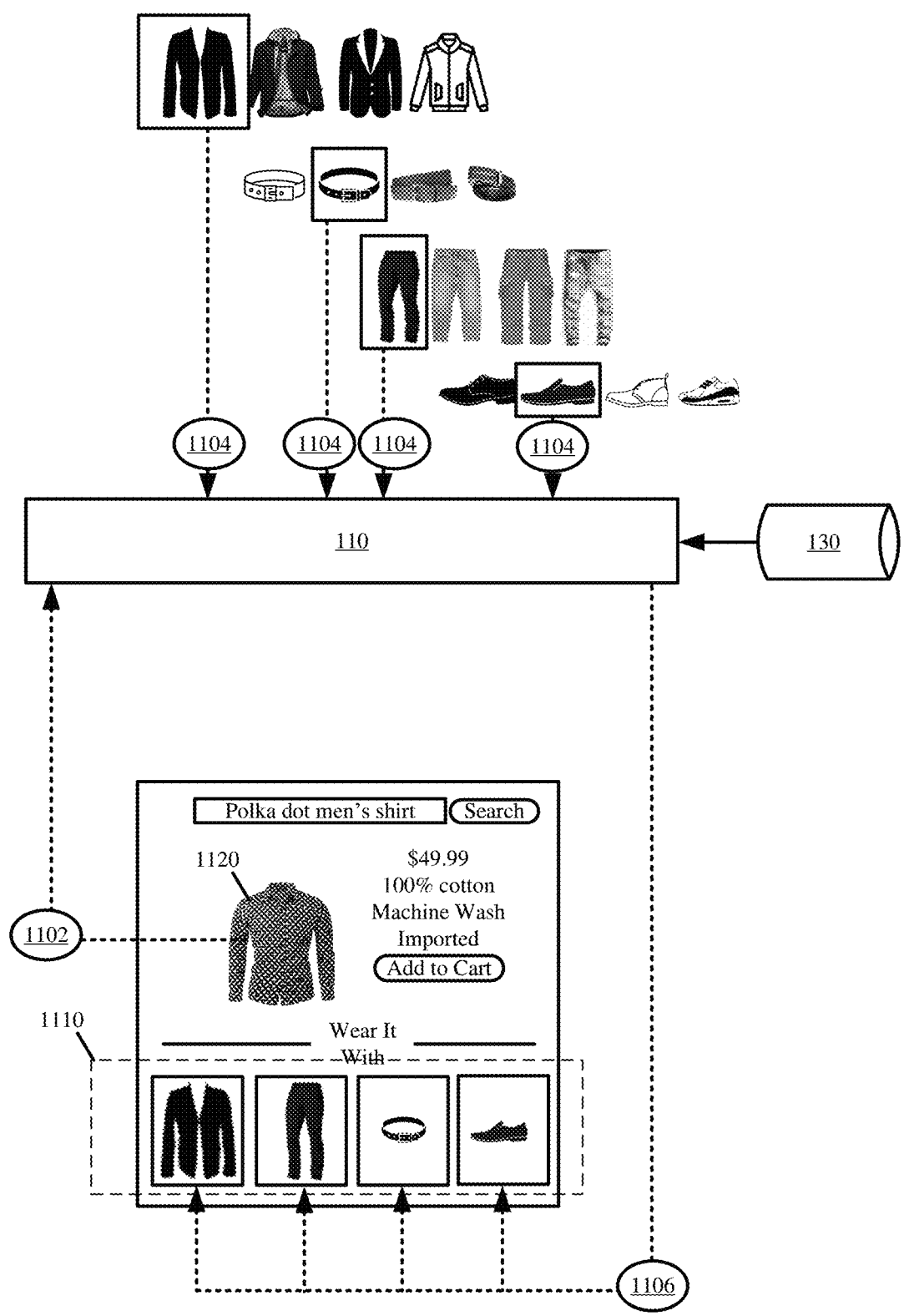
FIG. 11 illustrates an example of an inline customized presentation of an outfit in accordance with some embodiments presented herein.

Auto-style 110 may produce other customized presentations to present the collective style created by a plurality of different item type items of an outfit in a single interface. FIG. 11 illustrates an example of inline customized presentation 1110 of an outfit in accordance with some embodiments presented herein.

As before, inline customized presentation 1110 may be embedded or included as part of a site or page for particular item 1120 that is selected. For instance, a user may search for or select (at 1102) particular item 1120. Auto-styler 110 may determine (at 1104) different items from different item types that can be used to create a particular style in combination with particular item 1120. Auto-styler 110 may then include (at 1106) inline customized presentation 1110 in the site or page for particular item 1120.

Inline customized presentation 1110 may provide a non-overlapping row-based presentation of the items that conform to and create the particular style. In some embodiments, auto-styler 110 may define the inline customized presentation as a non-overlapping column-based, carousel-based, or other presentation of outfit items.

Auto-styler 110 may include or exclude particular item 1120 from inline customized presentation 1110, and may rearrange the outfit items to convey the particular style. For instance, auto-styler 110 may juxtapose a clothing top with outerwear, socks with shoes, jewelry with bags, etc.

In some embodiments, auto-styler 110 may be adapted to curating a style with other items or goods in categories other than clothing and clothing accessories. For example, auto-styler 110 may create a grouping for different home furnishings, furniture, and/or décor that have a common style, and may generate a single presentation or UI from which to present the style-conforming grouping. In this example, auto-styler 110 may generate a grouping that includes a rug, table, chair, and coffee table that conform to a particular style or style definition 130, the generated grouping may provide a particular arrangement of the goods in a single presentation so that the common style formed by the goods in the grouping can be visualized together. In particular, auto-styler 110 may provide a partially overlapping and vertically offset presentation of the rug, table, chair, and coffee table, or may provide an inline customized presentation to present the items in a non-overlapping row-based presentation similar to inline customized presentation 1110. A user may then interact with any of the goods in the grouping to select and/or purchase one or more goods.

In some embodiments, auto-styler 110 may curate a style using consumable goods. In some such embodiments, the style may be determined according to the flavor profile of different foods and drinks. For example, a grouping that conforms to a common style may include sweet and sour food and drink items. As another example, a grouping that conforms to a common style may include an appetizer, entrée, and dessert that fit a seafood style. Auto-styler 110 may ingest a plurality of consumable goods, determine attributes of the goods, match the attributes to a taxonomy, and generate a grouping of goods from different item types or food categories that conform to a particular style according to a template and one or more rules defined for that particular style of consumable goods.

In some embodiments, auto-styler 110 may include one or more devices with processor, memory, storage, and network resources that create the style-based or outfit-driven shopping experience. In some embodiments, auto-styler 110 may integrate with or operate as a service that enhances an online merchant or eCommerce site. For instance, auto-styler 110 may be part of or may be accessed by the front-end host of a merchant, wherein the front-end host may operate a server that receives requests from different UEs, and that responds to the requests with customized content that includes the outfits generated by auto-styler 110.

Figure 12:
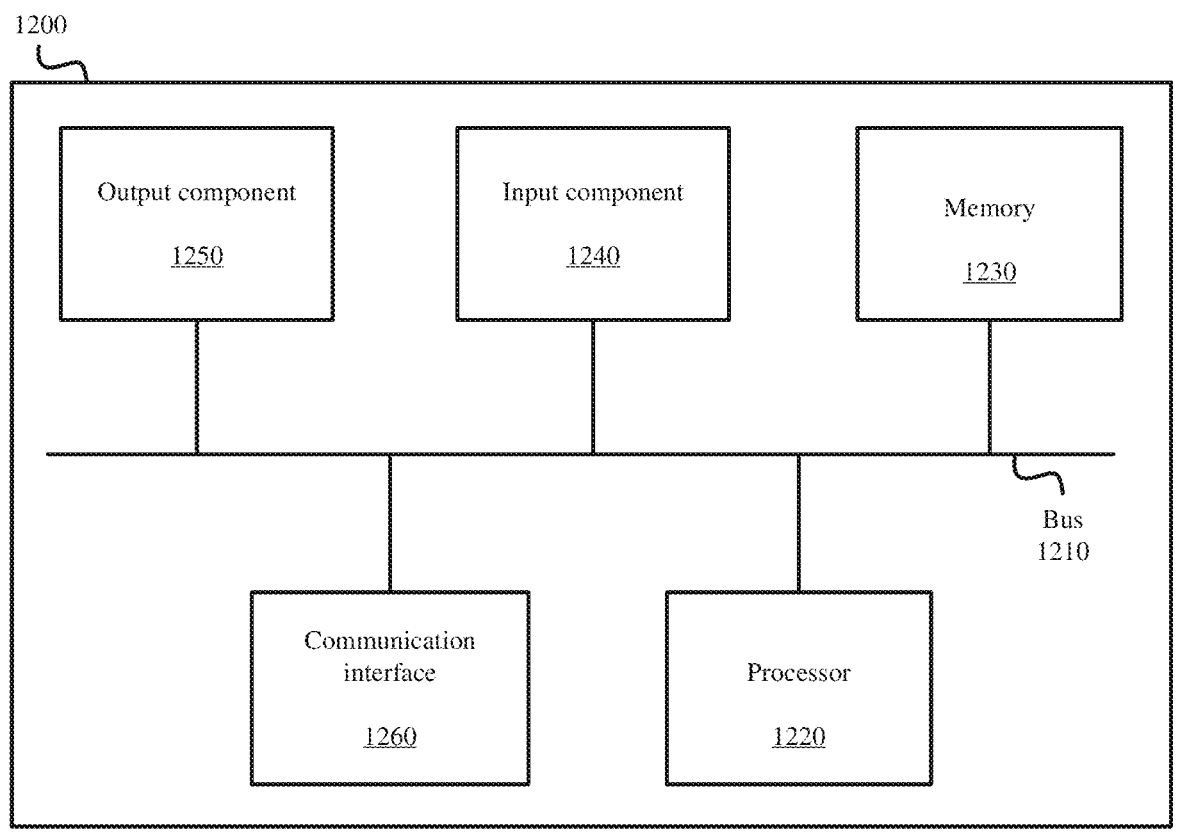
FIG. 12 illustrates example components of one or more devices, according to one or more embodiments described herein.

FIG. 12 is a diagram of example components of device 1200. Device 1200 may be used to implement one or more of the devices or systems described above (e.g., auto-styler 110, the front-end host, UEs, etc.). Device 1200 may include bus 1210, processor 1220, memory 1230, input component 1240, output component 1250, and communication interface 1260. In another implementation, device 1200 may include additional, fewer, different, or differently arranged components.

Bus 1210 may include one or more communication paths that permit communication among the components of device 1200. Processor 1220 may include a processor, microprocessor, or processing logic that may interpret and execute instructions. Memory 1230 may include any type of dynamic storage device that may store information and instructions for execution by processor 1220, and/or any type of non-volatile storage device that may store information for use by processor 1220.

Input component 1240 may include a mechanism that permits an operator to input information to device 1200, such as a keyboard, a keypad, a button, a switch, etc. Output component 1250 may include a mechanism that outputs information to the operator, such as a display, a speaker, one or more light emitting diodes ("LEDs"), etc.

Communication interface 1260 may include any transceiver-like mechanism that enables device 1200 to communicate with other devices and/or systems. For example, communication interface 1260 may include an Ethernet interface, an optical interface, a coaxial interface, or the like. Communication interface 1260 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1200 may include more than one communication interface 1260. For instance, device 1200 may include an optical interface and an Ethernet interface.

Device 1200 may perform certain operations relating to one or more processes described above. Device 1200 may perform these operations in response to processor 1220 executing software instructions stored in a computer-readable medium, such as memory 1230. A computer-readable medium may be defined as a non-transitory memory device. A memory device may include space within a single physical memory device or spread across multiple physical memory devices. The software instructions may be read into memory 1230 from another computer-readable medium or from another device. The software instructions stored in memory 1230 may cause processor 1220 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A computing system comprising:
   a first interface implemented using instructions executable on one or more hardware processors for presenting a collective style comprising multiple items in response to a request issued over a data network, wherein the first interface comprises:
   a customized presentation of a style-conforming outfit that is presented on a display, the style-conforming outfit comprising a combination of a first item of a first item type and a second item of a second item type, the combination being generated using at least one of artificial intelligence and machine learning, wherein the first item type corresponds to a first plurality of items and the second item type corresponds to a second plurality of items, and wherein the first plurality of items shares a first utility that differs from a second utility shared by the second plurality of items;

the instructions defining:
- a first position for a first image of the first item and a second position for a second image of the second item in the customized presentation based on a specified positioning that is defined for items of the first item type and items of the second item type in the customized presentation,
- a first sizing of the first image and a second sizing of the second image, and
- an automatic adjustment of the positioning or the sizing of the first image from the first position or the first sizing to a third position or a third sizing defined for the first image, wherein the third position or the third sizing is determined by the at least one of the artificial intelligence and the machine learning based on a comparison of the first position or the first sizing relative to positions or sizes of the second image and other item images in the customized presentation; and wherein, when presented on the display, the customized presentation is responsive to user input for navigation to additional interfaces associated with one or more of the first item and the second item.

2. The computing system of claim 1, wherein the first item type and the second item type are selected from a plurality of item types based on a definition including the first item type and the second item type.

3. The computing system of claim 2, wherein the definition is generated using the at least one of the artificial intelligence and the machine learning.

4. The computing system of claim 2, wherein the definition is generated based on user input provided by a customer or a merchant.

5. The computing system of claim 1, wherein each item comprises a plurality of item attributes, wherein the first item and the second item are determined based on filtering the first plurality of items and the second plurality of items respectively, and wherein said filtering comprises selecting items from the first plurality of items and the second plurality of items comprising item attributes that satisfy style parameters of a definition generated using the at least one of the artificial intelligence and the machine learning.

6. The computing system of claim 1, wherein the first interface further comprises instructions for automatically discarding a second outfit comprising a second combination of the first item of the first item type and a third item of the second item type upon determining that the second combination of the first item and the third item violates one or more rules of a definition.

7. The computing system of claim 1, wherein the combination being generated using the at least one of the artificial intelligence and the machine learning comprises the instructions further causing the one or more hardware processors to:
- ingest the first plurality of items corresponding to the first item type and the second plurality of items corresponding to the second item type;
- extract a set of attributes for each item of the first plurality of items and the second plurality of items;
- classify each item of the first plurality of items and the second plurality of items based on the set of attributes; and
- determine that the combination of the first item and the second item comprises attributes that match conditions of a definition generated using the at least one of the artificial intelligence and the machine learning.

8. The computing system of claim 1, wherein the first item type comprises a first type of clothing or clothing accessories, wherein the second item type comprises a different second type of clothing or clothing accessories, and wherein the first image being automatically adjusted comprises aligning a neckline of the first image to a neckline of the second image.

9. The computing system of claim 1, wherein the first position for the first image and the second position for the second image results in a portion of the first image overlapping a portion of the second image based on a z-depth ordering in a definition specifying a closer position for the first item type than the second item type.

10. The computing system of claim 1, wherein the first item comprises a clothing top and the second item comprises a clothing bottom, wherein each of the clothing top and the clothing bottom contributes to the collective style of the style-conforming outfit being a particular style selected from the group consisting of:
- a seasonal style, a formal style or a casual style, and wherein a definition generated using the at least one of the artificial intelligence and the machine learning defines the particular style selected for the style-conforming outfit.

11. The computing system of claim 1, wherein a definition generated using the at least one of the artificial intelligence and the machine learning specifies that the first item type and the second item type comprise clothing with different patterns, and wherein the first item is a clothing item with one of a checkered, striped, or plain pattern, and the second item is a different clothing item with another of a checkered, striped, or plain pattern.

12. The computing system of claim 1, wherein a definition generated using the at least one of the artificial intelligence and the machine learning specifies that the first item type and the second item type comprise different types of clothing with particular coloring, and wherein the instructions further define:
- filtering of the first plurality of items to a first subset of the first plurality of items with the particular coloring;
- filtering of the second plurality of items to a second subset of the second plurality of items with the particular coloring; and
- selection of the first item from the first subset of items, and the second item from the second subset of items.

13. The computing system of claim 1, wherein a definition specifies a total price for the style-conforming outfit to be less than a particular amount, and wherein the first item and the second item of the style-conforming outfit are determined based on the instructions further defining a sum of a first cost of the first item and a second cost of the second item being less than the particular amount.

14. The computing system of claim 1, wherein a definition generated using the at least one of the artificial intelligence and the machine learning specifies that the first item type is of a common brand as the second item type, and wherein the instructions further define:
- selection of the first item from the first plurality of items of the first item type;
- determining that the first item is of a particular brand;
- filtering of the second plurality of items of the second item type to a subset of items of the particular brand; and
- selecting the second item from the subset of items.

15. The computing system of claim 1, wherein the customized presentation of the style-conforming outfit further comprises:
the combination of the first item and the second item selected from a plurality of different combinations of items of the first item type and the second item type based on a ranking associated with the plurality of different combinations of items of the first item type and the second item type, wherein the ranking is based on a percentage match between attributes of each of the different combinations of items and attributes defined for the style-conforming outfit in the definition.

16. The computing system of claim 1, wherein the first interface further comprises:
a different customized presentation of a different second style-conforming outfit that is generated using the at least one of the artificial intelligence and the machine learning, wherein the second style-conforming outfit comprises a combination of a third item of the first item type and the second item of the second item type, wherein selection of the third item is prioritized over selection of the first item upon determining, based on tracking user engagement with a merchant site, that the third item has more user engagement than the first item.

17. The computing system of claim 1, wherein the first item and the second item are selected based on tracking prior engagement of a particular user, and wherein the selection of the first item and the second item further comprises determining that the first item and the second item matches a style of an outfit comprising a third item purchased by the particular user during the prior engagement.

18. The computing system of claim 1, wherein a definition is selected from a plurality of definitions based on determining that a particular user, whose prior engagement was tracked, has requested access to a site, and wherein the selection of the definition further comprises determining that the definition conforms to a particular style associated with prior purchases of the particular user.

19. The computing system of claim 1, wherein the style-conforming outfit is selected from a plurality of style-conforming outfits with different collective styles that conform to different definitions upon determining, based on tracking user engagement with a merchant site, that the style-conforming outfit received more user engagement than any other outfit of the plurality of style-conforming outfits.

20. The computing system of claim 1, wherein the customized presentation being responsive to user input for navigation to the additional interfaces further comprises:
the customized presentation being responsive to the user input for navigation to a second interface, the second interface comprising an inline customized presentation of the style-conforming outfit, wherein the inline customized presentation comprises a third image of the first item and a fourth image of the second item positioned in a non-overlapping fashion, wherein the third image and the fourth image are selectable for navigation to the additional interfaces.

21. The computing system of claim 20, wherein the third image is the same as the first image and the fourth image is the same as the second image.

22. The computing system of claim 1, wherein the instructions defining the specified positioning or the specified sizing for automatically adjusting the first image further define customization of one or more of the specified positioning or the specified sizing according to an adjusted positioning or an adjusted sizing that is automatically detected within other style-conforming outfits.

23. A system for presenting a plurality of interactive interfaces comprising style-conforming outfits that each have multiple items, the system comprising:
a first interface implemented using instructions executable on one or more hardware processors, the first interface comprising:
a plurality of first customized presentations of a plurality of style-conforming outfits, each style-conforming outfit of the plurality of style-conforming outfits comprising a same first item of a first item type and one or more additional items of one or more additional item types; and
the instructions defining:
an overlapping arrangement of images of at least two of the items in each particular customized presentation of the first customized presentations,
an automatic adjustment to an amount of overlap between the images of the at least two of the items using a specified positioning criterion that is defined for the first item type included in the particular customized presentation, wherein the automatic adjustment comprises adjusting a positioning or sizing of an image for an item of the first image type from a first position or a first sizing to a second position or a second sizing that is determined by at least one of artificial intelligence and machine learning based on a comparison of the first position or the first sizing relative to positions or sizes of other images in the particular customized presentation;
wherein, when presented on a display, each of the first customized presentations is responsive to user input for navigation to a second interface; and
the second interface implemented using instructions executable on the one or more hardware processors, the second interface comprising:
a second customized presentation of a selected first customized presentation of the style-conforming outfit, wherein the second customized presentation comprises images of each of the at least two items in the selected first customized presentation arranged in a non-overlapping arrangement.

24. A method for presenting a collective style comprising multiple items in a first interface implemented using instructions executable on one or more hardware processors, the method comprising:
generating a customized presentation of a style-conforming outfit that is presented on a display, the style-conforming outfit comprising a combination of a first item of a first item type and a second item of a second item type, the combination being generated using at least one of artificial intelligence and machine learning, wherein the first item type corresponds to a first plurality of items and the second item type corresponds to a second plurality of items, and wherein the first plurality of items shares a first utility that differs from a second utility shared by the second plurality of items;
positioning a first image of the first item in a first position and a second image of the second item in a second position in the customized presentation based on a specified positioning that is defined for items of the first item type and items of the second item type in the customized presentation;
sizing the first image and the second image based on a specified sizing for the first item type and the second item type;

automatically adjusting the positioning or the sizing of the first image from one or more of the first position or the specified sizing to a third position or a third sizing defined for the first image, wherein the third position or the third sizing is determined by the at least one of the artificial intelligence and the machine learning based on a comparison of the first position or the first sizing relative to positions or sizes of the second image and other item images in the customized presentation; and in response to a user input on the display of the customized presentation, navigating to additional interfaces associated with one or more of the first item and the second item.

25. The method of claim 24, wherein the first item type and the second item type are selected from a plurality of item types based on a definition including the first item type and the second item type.

26. The method of claim 25, wherein the definition is generated using the at least one of the artificial intelligence and the machine learning.

27. The method of claim 25, wherein the definition is generated based on user input provided by a customer or a merchant.

* * * * *